(12) United States Patent
Liu et al.

(10) Patent No.: US 11,850,734 B2
(45) Date of Patent: Dec. 26, 2023

(54) GRIPPER DEVICE

(71) Applicant: HIWIN TECHNOLOGIES CORP., Taichung (TW)

(72) Inventors: Ming-Shiou Liu, Taichung (TW); Chen-Ming Wong, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 386 days.

(21) Appl. No.: 17/303,576

(22) Filed: Jun. 2, 2021

(65) Prior Publication Data
US 2022/0072717 A1    Mar. 10, 2022

(30) Foreign Application Priority Data

Sep. 9, 2020 (TW) ................................ 10913084.6

(51) Int. Cl.
*B25J 15/02* (2006.01)

(52) U.S. Cl.
CPC ................................ *B25J 15/0206* (2013.01)

(58) Field of Classification Search
CPC .......................... B25J 15/0206; B25J 15/0028; B25J 15/0253; B25J 15/0033; B21D 43/003
See application file for complete search history.

(56) References Cited

U.S. PATENT DOCUMENTS

| | | | |
|---|---|---|---|
| 8,973,958 B2 * | 3/2015 | Allen Demers | B25J 15/0266 901/39 |
| 10,279,484 B2 * | 5/2019 | Birglen | B25J 15/12 |
| 11,312,027 B2 * | 4/2022 | Albright | B25J 15/12 |
| 2005/0218679 A1 * | 10/2005 | Yokoyama | B25J 9/142 294/99.1 |
| 2015/0028613 A1 * | 1/2015 | Nakayama | B25J 15/0206 294/196 |
| 2021/0129355 A1 * | 5/2021 | Son | B25J 15/12 |

FOREIGN PATENT DOCUMENTS

| | | |
|---|---|---|
| CN | 107322625 A | 11/2017 |
| CN | 206643944 U | 11/2017 |
| EP | 3305479 A2 | 4/2018 |
| JP | 2019-162690 A | 9/2019 |
| KR | 10-2019-0142259 A | 12/2019 |

* cited by examiner

*Primary Examiner* — Stephen A Vu
(74) *Attorney, Agent, or Firm* — Wang Law Firm, Inc.

(57) ABSTRACT

A gripper device includes a base and two gripping assemblies, each including a gripping member, a stand, and an elastic member. The gripping member includes a gripping portion and a supporting portion. The stand is movably disposed to the base and includes a connecter and a supporter. The supporting portion is pivotally connected to the supporter at a position between the gripping portion and the connecter so that the gripping member is pivotable relative to the stand. Two opposite ends of the elastic member are respectively connected to the supporting portion and the connecter. When one of the gripping portions touches an object, the gripping member pivots relative to the corresponding stand. Therefore, gripping a target may not be interrupted by interference objects around the target.

11 Claims, 12 Drawing Sheets

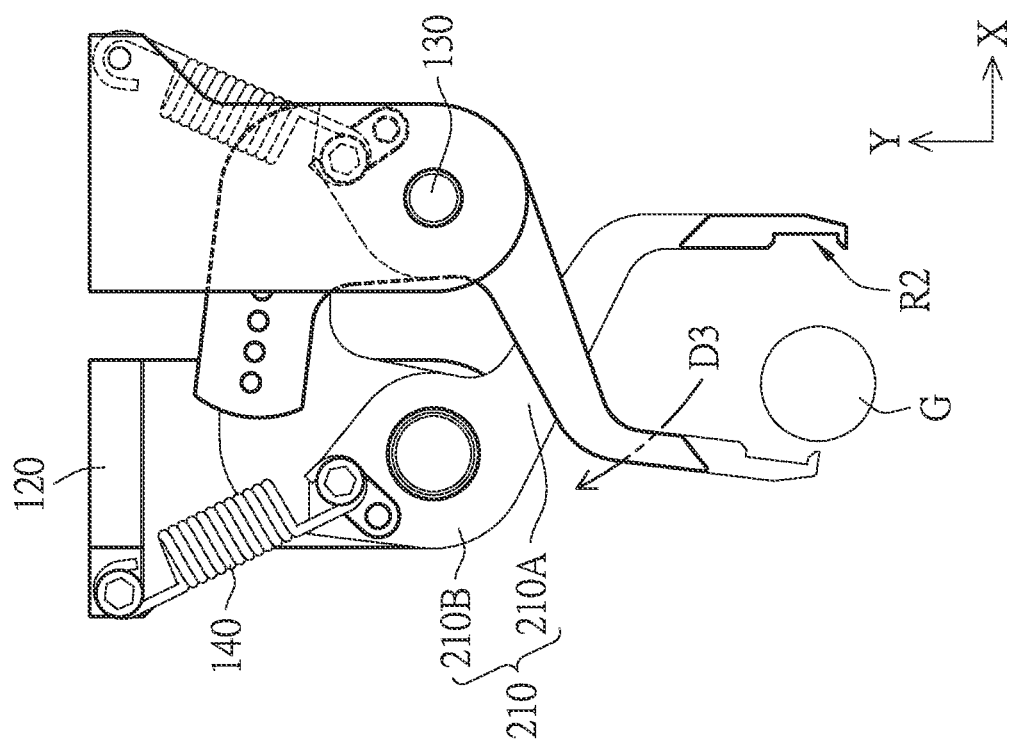
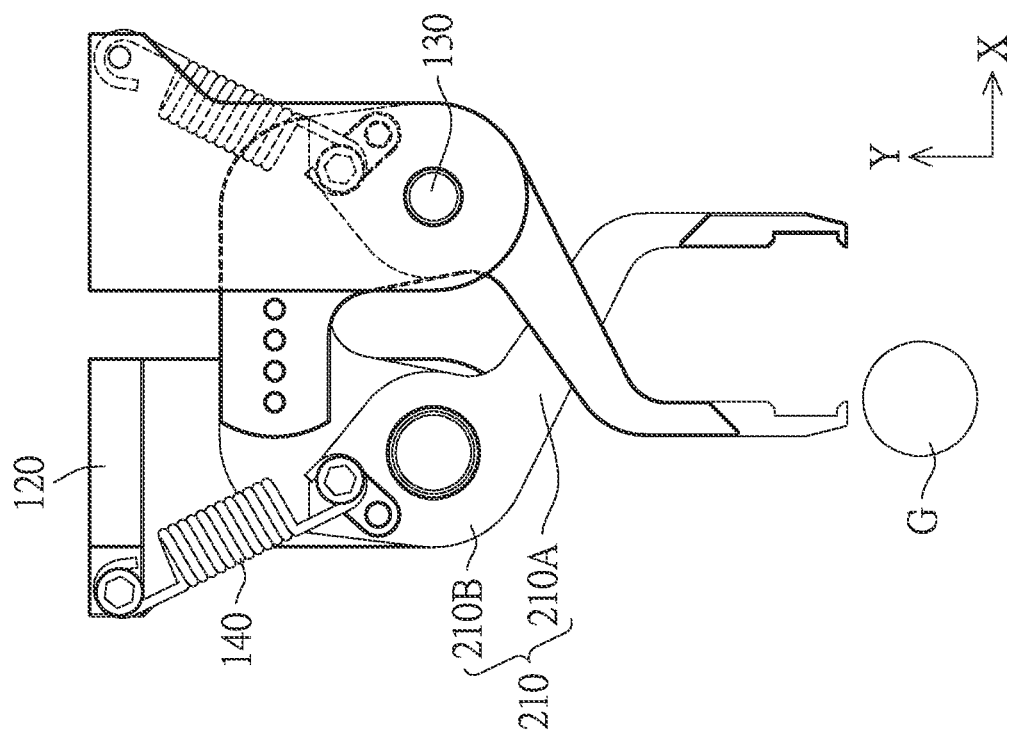

GRIPPER DEVICE

BACKGROUND

Field of the Invention

The present invention relates to a gripper device, and more particularly to a self-adaptive gripper device.

Description of Related Art

The existing gripper device, as shown in FIG. 1A, essentially includes a base A1 and two gripping assemblies A2. Each gripping assembly A2 includes a supporter A21 connected to the base A1, a spring A22 disposed in the supporter A21, and a gripping portion A23 connected to the supporter A21 through the spring A22. The two gripping assemblies A2 can approach or move away from each other through the moving mechanism of the base A1. To grip an object G, the gripper device moves down along the axis Y to approach the object G until the object G enters the space between the two gripping portions A23; then, the two gripping assemblies A2 move along the axis X to approach each other until the two gripping portions A23 grip the object G; and finally, the gripper device moves upward along the axis Y to complete the gripping task. However, when the gripper device attempts to grip a target from a large group of objects G, the gripping portions A23 tend to retract upward because they touch the target or other objects G before grasping the target, resulting in failing to accomplish the task of picking up the target.

Another existing gripper device, as shown in FIG. 1B, essentially includes a base B1 and two gripping assemblies B2. Each gripping assembly B2 includes a first supporter B21 and a second supporter B22 that are connected to the base B1 and can pivot relative to the base B1, and a gripping portion B23 which is connected to the first support frame B21 and the second support frame B22 and can swing relative to the foregoing two. The first supporter B21 and the second supporter B22 are each provided with joints. Similarly, when the gripper device attempts to grip a target from a large group of objects, the gripping portions B23 are likely to retract because they touch the target or other objects before grasping the target, resulting in failing to accomplish the task of picking up the target.

Therefore, the existing gripper devices still need to be improved.

SUMMARY

To solve the forgoing problems, one objective of the present invention is to provide a gripper device capable of adapting to the environment where a target object to be taken is located.

A gripper device in accordance with one embodiment of the invention includes: a base and two gripping assemblies. Each of the gripping assemblies includes a gripping member, a stand and an elastic member. The gripping member includes a gripping portion and a supporting portion, and the supporting portion includes a first pivoting portion. The stand is movably disposed to the base and includes a connector and a supporter, wherein the supporter includes a second pivoting portion pivotally connected to the first pivoting portion, and a position where the first pivoting portion and the second pivoting portion are pivotally connected is located between the gripping portion and the connector, so that the gripping member is able to pivot relative to the stand. The elastic member includes a first end and a second end opposite to the first end, wherein the first end of the elastic member is connected to the supporting portion, and the second end of the elastic member is connected to the connector. When the gripping portion of the gripping member of one of the gripping assemblies touches an object and the two gripping assemblies do not abut against each other, the gripping member pivots relative to the corresponding stand; and when the gripping portion of the gripping member of the one of the gripping assemblies touches the object and the supporting portions of the two gripping assemblies abut against each other, the pivoting of the gripping members is restricted so that the object is gripped by the gripping portions.

In this way, the gripper device provided by the present invention can adapt to the environment where the object to be gripped is located, eliminate the influence of interference objects and continue to complete the gripping task.

BRIEF DESCRIPTION OF THE DRAWINGS

After studying the detailed description in conjunction with the following drawings, other aspects and advantages of the present invention will be discovered:

FIGS. 7A to 7D are schematic views showing the movement states of the gripper device of FIG. 6 for gripping an object according to an embodiment of the present invention.

DETAILED DESCRIPTION

In the following detailed description, many specific details are explained in order to provide a thorough understanding of the present invention. However, those of ordinary skill in the art will understand that the present invention can be practiced without these specific details. In other cases, well-known methods, procedures and/or elements have not been described in detail so as not to obscure the present invention.

Figure 2:
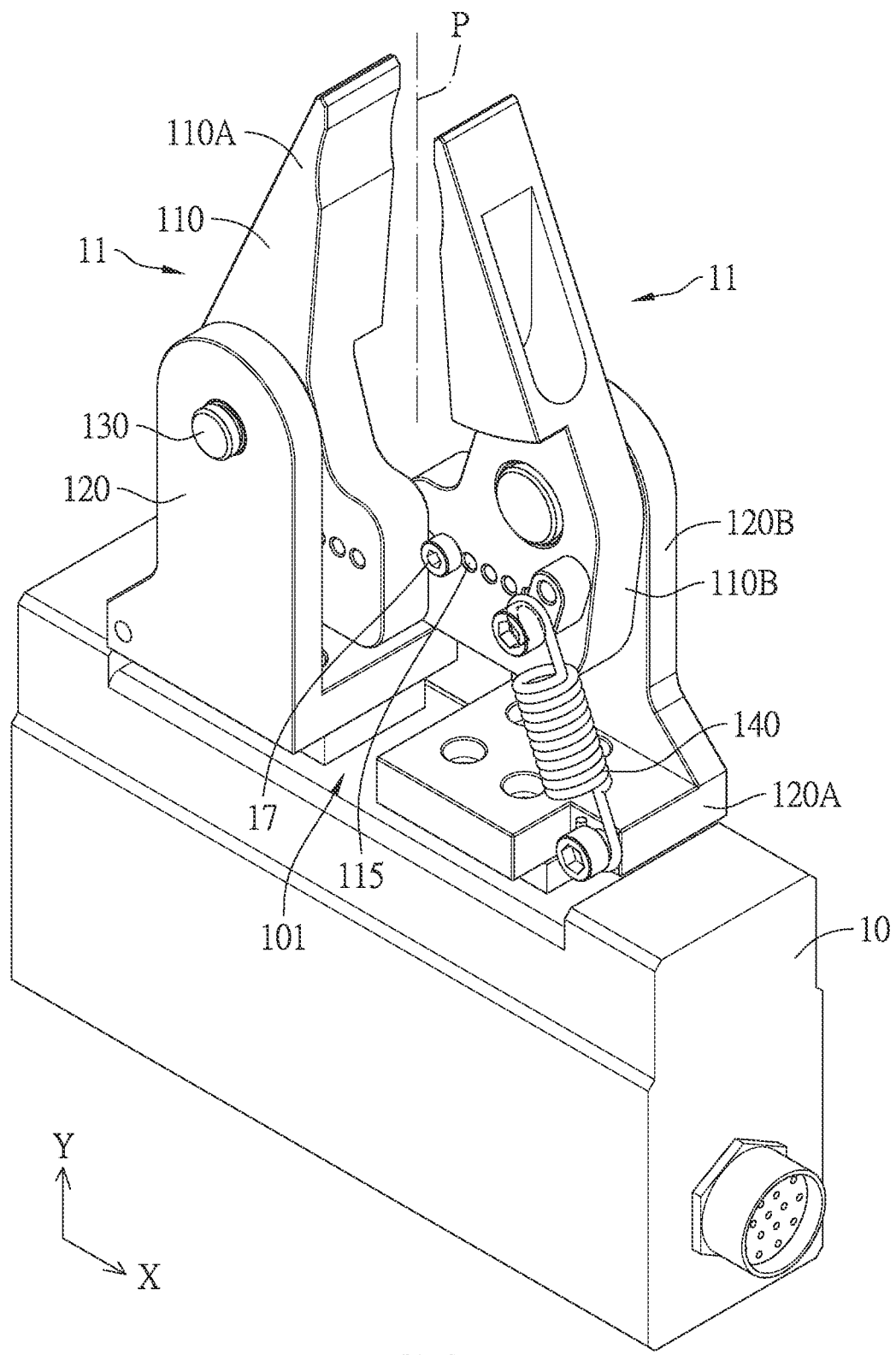
FIG. 2 is a perspective view of a gripper device according to an embodiment of the present invention.
Figure 3:
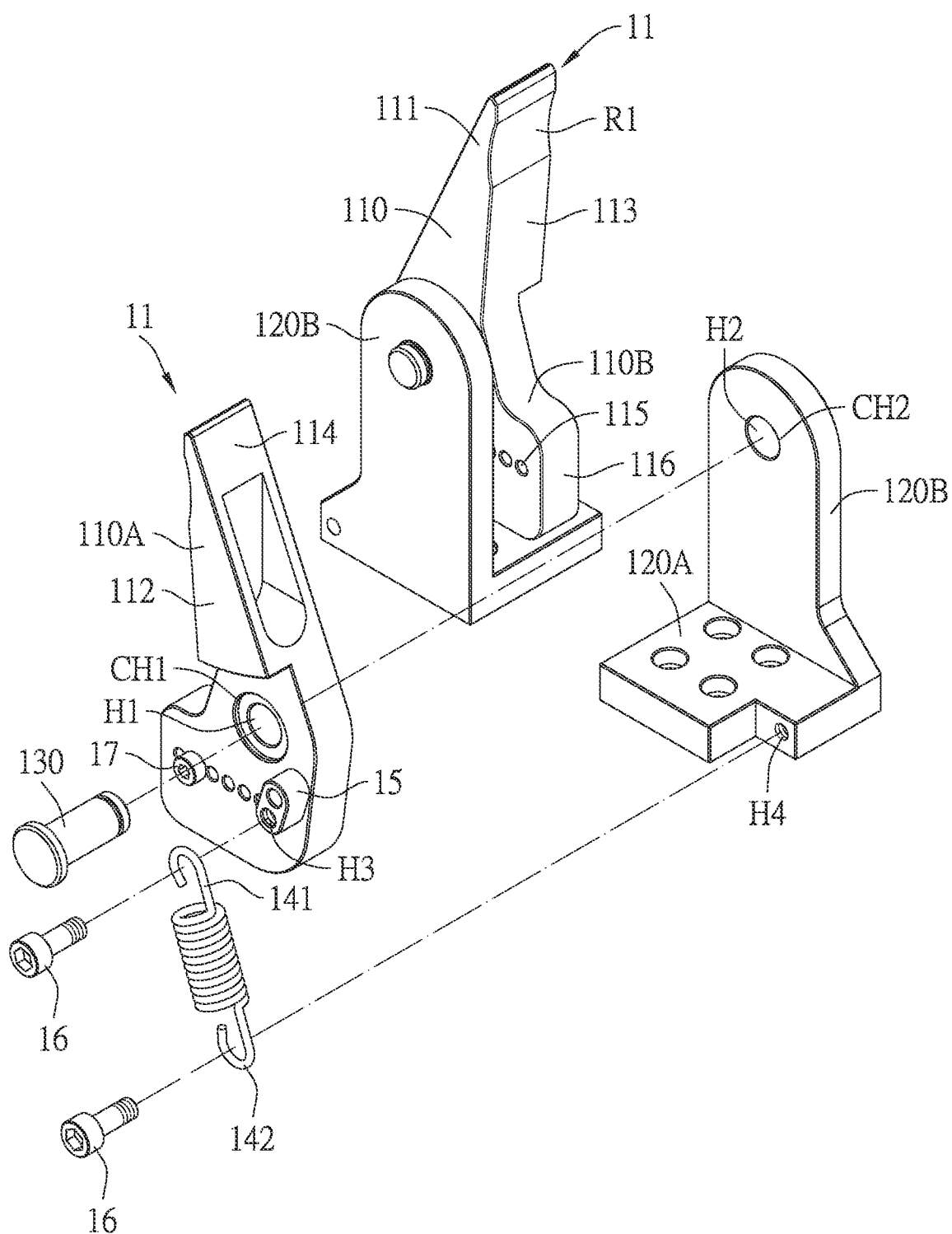
FIG. 3 is an exploded schematic view of the gripping assemblies in the gripper device of FIG. 2.
Figure 4A:
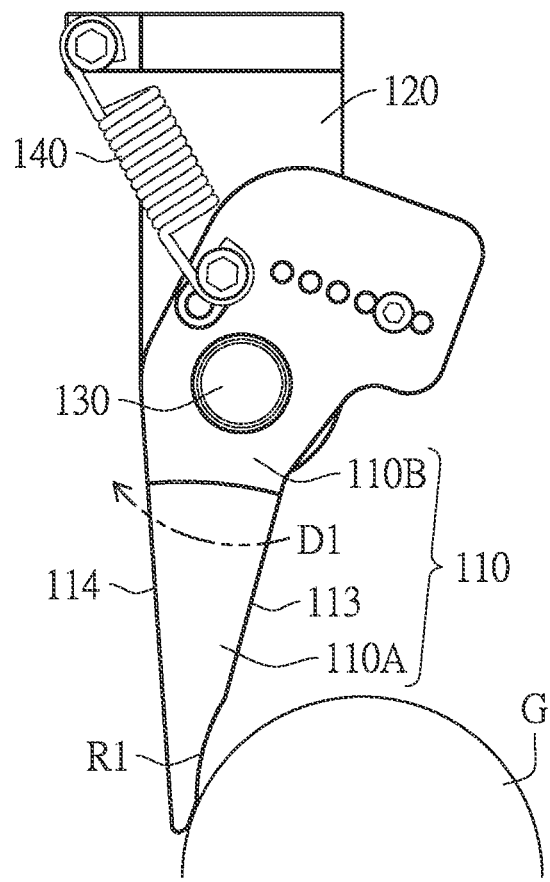
FIG. 4A is a schematic view showing a movement state of a gripping assembly of FIG. 2 according to an embodiment of the present invention when it touches a target object.
Figure 4B:
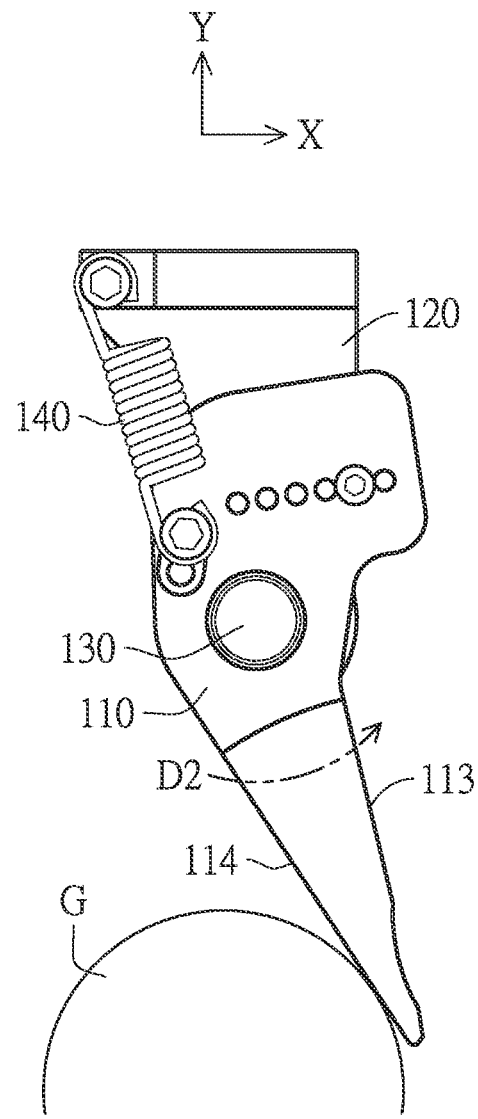
FIG. 4B is a schematic view showing a movement state of a gripping assembly of FIG. 2 according to an embodiment of the present invention when it touches an interference object.

Please refer to FIGS. 2 and 4B, a gripper device according to an embodiment of the present invention is suitable for gripping an object, especially suitable for gripping one object G from a group of objects G. The present invention does not limit the type of the object G, but for the convenience of explaining the spirit of the present invention, the following embodiments will take the object G as a steel ball as an example.

As shown in the figure, the gripper device includes a base 10 and two gripping assemblies 11. The base 10 is movable in an axis Y (i.e., the first axis) and includes a motion mechanism 101. The two gripping assemblies 11 are separatable from each other and are respectively movably installed on the base 10. Each gripping assembly 11 includes a gripping member 110, a stand 120, a pivoting member 130 and an elastic member 140. Each component will be described in detail as follows.

Each of the gripping members 110 includes a first surface 111, a second surface 112 opposite to the first surface 111, a third surface 113 connected to the first surface 111 and the second surface 112, and a fourth surface 114 opposite to the third surface 113. The gripping member 110 further includes a gripping portion 110A and a supporting portion 110B. The gripping portion 110A extends along an axis Y from the supporting portion 110B. The gripping portion 110A touches the object G when gripping the object G. The supporting portion 110B is connected to the gripping portion 110A and includes a first pivoting portion CH1. The first pivoting portion CH1 may, for example, include a first mounting hole H1, and the first mounting hole H1 extends from the first surface 111 to the second surface 112. A groove R1 is recessed on the third surface 113, and the groove R1 is used to let the object G be held between the two third surfaces 113 of the two gripping members 110 when the object G is gripped.

The two stands 120 are movably disposed to the motion mechanism 101, so that when the two stands 120 move relative to each other along the axis X (i.e., the second axis) on the motion mechanism 101, the two gripping assemblies 11 can move relative to each other along the axis X on the base 10. Each stand 120 includes a connector 120A and a supporter 120B. The connectors 120A is used to be installed to the motion mechanism 101. The supporter 120B includes a second pivoting portion CH2 pivotally connected to the first pivoting portion CH1. The second pivoting portion CH2 may, for example, include a second mounting hole H2, and the second mounting hole H2 corresponds to the first mounting hole H1 in location. Therefore, in assembling the gripper device, the pivoting member 130 can be inserted into the first mounting hole H1 and the second mounting hole H2 so that the gripping member 110 can pivot relative to the stand 120. A position where the first pivoting portion CH1 and the second pivoting portion CH2 are pivotally connected is located between the gripping portion 110A and the connector 120A, that is, the pivoting member 130 is located between the gripping portion 110A and the connector 120A.

The elastic member 140 may be, for example, a spring. The elastic member 140 includes a first end 141 and a second end 142 opposite to the first end 141. The first end 141 of the elastic member 140 is connected to the supporting portion 110B, and the second end 142 of the elastic member 140 is connected to the connector 120A, so that the elastic member 140 is located between the supporting portion 110B and the connector 120A. Specifically, each of the gripping assemblies 11 further includes a connecting member 15 and two locking members 16. The connecting member 15 is configured to be disposed to the supporting portion 110B, for example, assembled to the supporting portion 110B by a locking member, or forms one piece together with the gripping supporting portion 110B. The connecting member 15 includes a third mounting hole H3. One of the locking members 16 can be inserted into the third mounting hole H3, whereby the first end 141 of the elastic member 140 can be connected to the supporting portion 110B through the locking member 16; and for example, the first end 141 of the elastic member 140 is hung on the locking member 16. The connector 120A of each of the stands 120 further includes a fourth mounting hole H4. Another locking member 16 can be inserted into the fourth mounting hole H4, whereby the second end 142 of the elastic member 140 can be connected to the connector 120A through the locking member 16; and for example, the second end 142 of the elastic member 140 is hung on the locking member 16.

In this embodiment or other embodiments, at least one gripping assembly 11 further includes an adjustment member 17 and an adjustment mechanism 115 on the supporting portion 110B. The adjustment member 17 is used to be installed on the adjustment mechanism 115. The first mounting hole H1 is located between the adjustment mechanism 115 and the gripping portion 110A, that is, the rotation center of the gripping member 110 is located between the adjustment mechanism 115 and the gripping portion 110A. The adjustment mechanism 115 includes a plurality of adjustment positions which can be arranged along the axis X. Therefore, the supporting portion 110B of one of the gripping members 110 can abut against the adjustment member 17 mounted on the other gripping member 110. A different adjustment position where the adjustment member 17 is located varies the size of the space between the two gripping portions 110A, or the size of the space between the two grooves R1.

In FIG. 2, the adjustment mechanism 115 provides a plurality of plugholes respectively corresponding to the aforementioned adjustment positions in an example, and however, the present invention is not limited thereto. In other embodiments, the adjustment mechanism may be, for example, a sliding groove, and the above adjustment positions are respectively arranged on the sliding groove; or, the adjustment mechanism may be, for example, a long groove with a gear rack on the inner surface thereof, and the aforementioned adjustment positions are respectively arranged on the long groove. It is possible that different types of adjustment mechanisms 15 pair up with appropriate types of adjustment members 17.

In this embodiment or other embodiments, the supporting portion 110B of each gripping member 110 further includes a protruding structure 116 protruding from the third surface 113. The protruding structure 116 may be protruded from the third surface 113 along the axis X, for example. Since the two third surfaces 113 of the two gripping members 110 face each other, the two protruding structures 116 also face each other. A part of the third surface 113, located at the protruding structure 116, may be, for example, a flat surface or a curved surface.

In the process of gripping the object G, the gripper device first moves along the axis Y. In one case, when the third surface 113 of the gripping portion 110A touches an object G considered a target object, as shown in FIG. 4A, the gripping member 110 slightly swings along the direction D1. Then, the gripper device continues moving along the axis Y until the target object enters the grooves R1. After that, the two gripping members 110 are brought close to each other along the axis X until the supporting portion 110B of one of the gripping members 110 touches the adjustment member 17 of the other gripping member 110, as shown in FIG. 2. When the two gripping members 110 are moving close to each other, the gripping members 110 swing slightly along the direction D2 in FIG. 4B until the force balance occurs between the tensile force on each elastic member 140 connected to the stand 120 and the gripping supporting portion 110B and the contact force of the gripping portion 110A touching the object G. At this time, the two gripping portions 110A can clamp the target object so that the target object is held on the central axis P of the gripper device. Then, the gripper device can move in the opposite direction along the axis Y to complete the gripping task.

In another case, when the fourth surface 114 of one of the gripping portions 110A touches an object G considered an interference object, as shown in FIG. 4B, the gripping member 110 slightly swings in the direction D2 until the force balance occurs between the tension on the elastic member 140 connected to the stand 120 and the supporting portion 110B and the contact force of the gripping portion 110A touching the interference object. When the force balance is reached, the gripper device continues moving down along the axis Y until the target object enters the space between the two gripping portions 110A, and then, the two gripping members 110 are controlled to approach each other along the axis X to clamp the target object.

The above embodiments are described based on an example of the gripper device in which the two gripping members 110 do not cross each other when gripping an object G, but the present invention is not limited to this example. In other embodiments of the present invention, the two gripping members may cross each other when clamping an object G.

Figure 5:
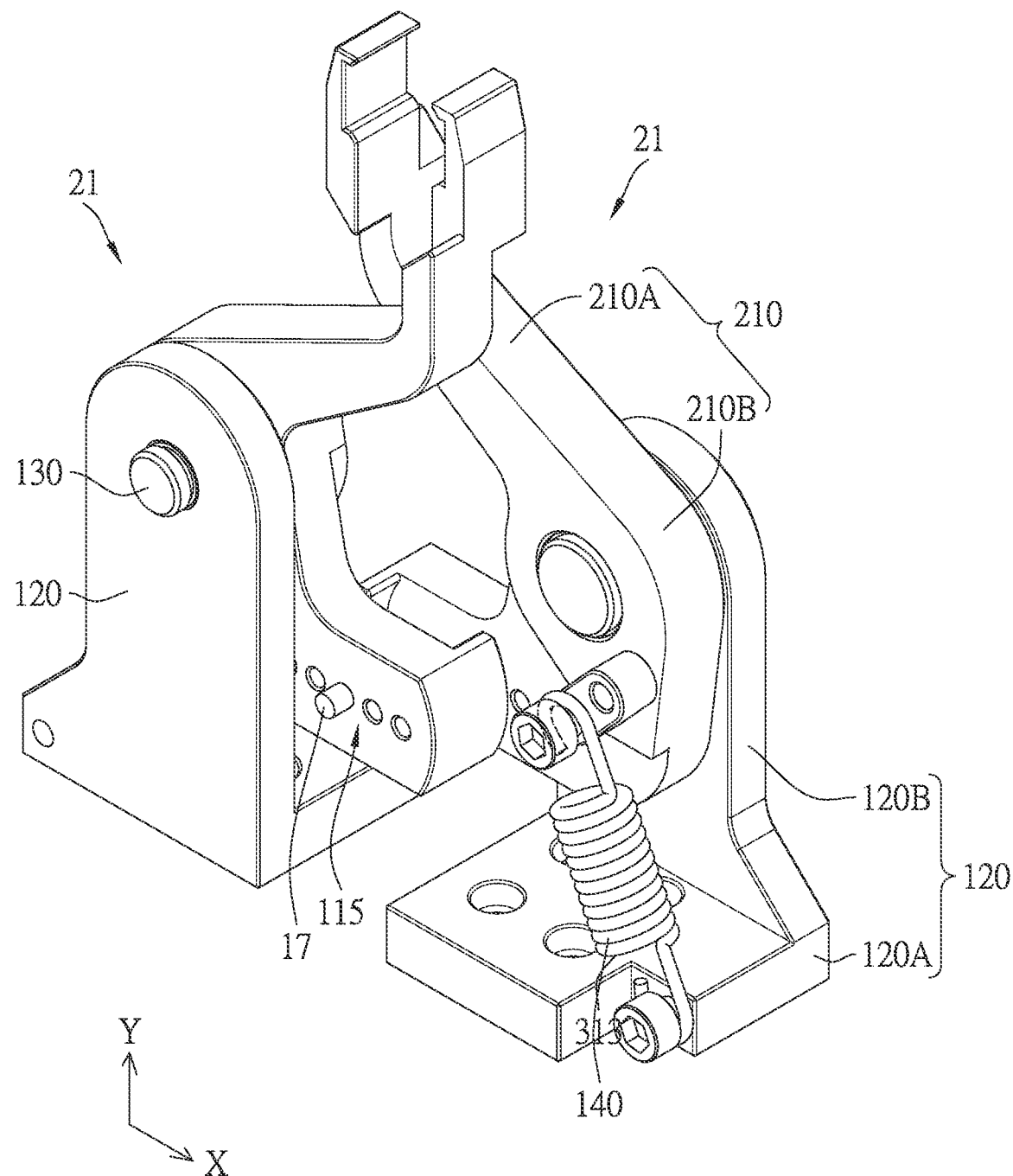
FIG. 5 is a perspective view of a gripper device according to another embodiment of the present invention.
Figure 6:
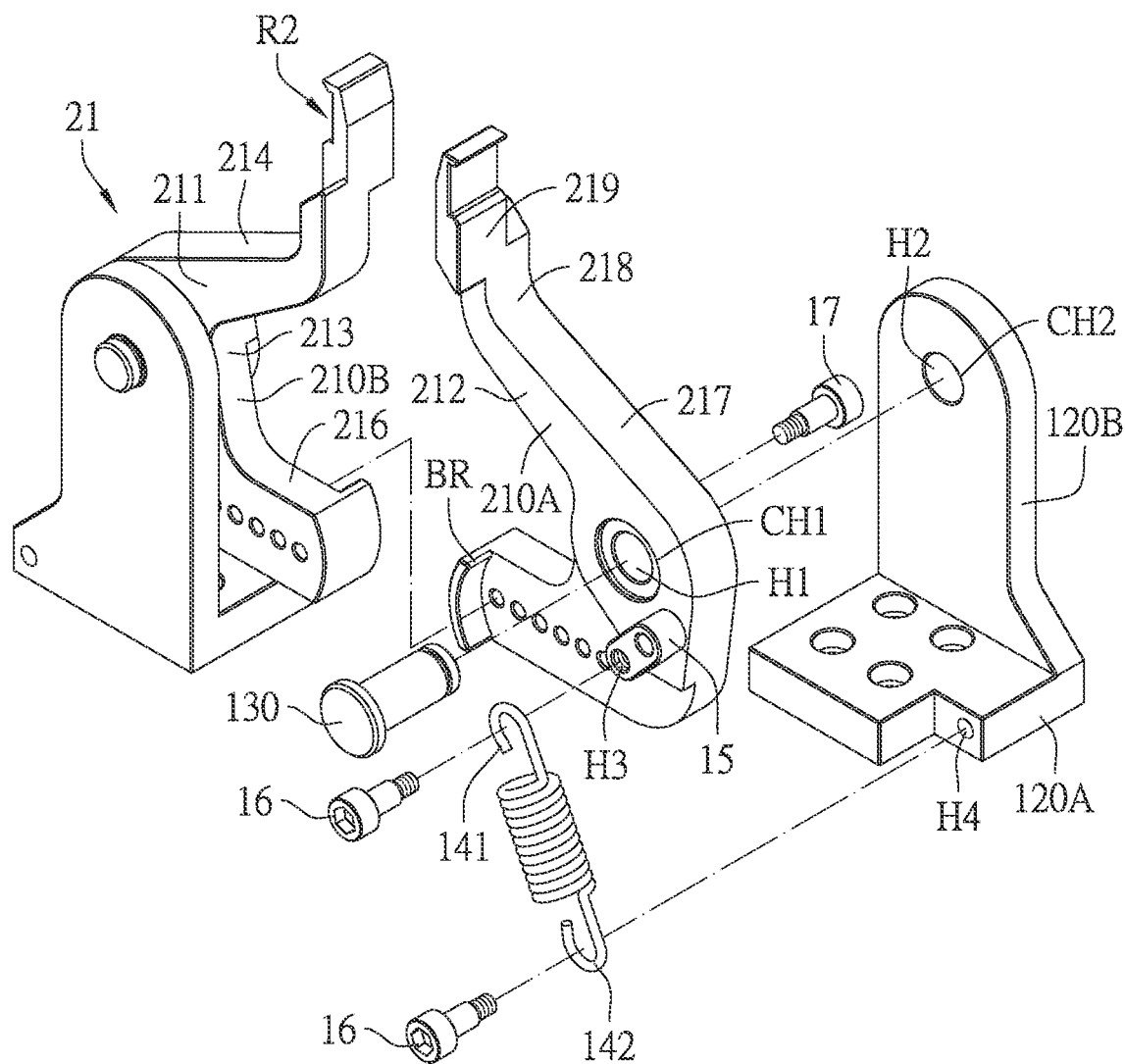
FIG. 6 is an exploded schematic view of the gripping assemblies of the gripper device of FIG. 5.

Please refer to FIGS. 5, 6 and 7A to 7D, the two gripping assemblies 21 of the gripper device each include a gripping member 210, a stand 120, a pivoting member 130, and an elastic member 140. The stand 120, the pivoting member 130 and the elastic member 140 in FIG. 5 are the same as the stand 120, the pivoting member 130 and the elastic member 140 in the embodiment shown in FIG. 2. Therefore, how to use the pivoting members 130 to assemble the gripping members 210 to the stands 120 and how to assemble the elastic members 140 to the stands 120 and the gripping members 210 can refer to the above-mentioned related description, and are omitted hereinafter.

Each gripping member 210 includes a first surface 211, a second surface 212 opposite to the first surface 211, a third surface 213 connected to the first surface 211 and the second surface 212, and a fourth surface 214 opposite to the third surface 213. Each gripping member 210 further includes a gripping portion 210A and a supporting portion 210B. The gripping portion 210A extends along the axis Y from the supporting portion 210B. The gripping portions 210A touches the object G when gripping the object G. Each supporting portion 210B includes a first pivoting portion CH1. The first pivoting portion CH1 may, for example, include a first mounting hole H1, and the first mounting hole H1 extends from the first surface 211 to the second surface 212. A portion of the fourth surface 214 at the gripping portion 210A is recessed to form a groove R2.

Each gripping portion 210A includes a first section 217, a curved section 218, and a second section 219, and the curved section 218 is located between the first section 217 and the second section 219. The first section 217 is inclined toward a central axis of the gripper device, and the second section 219 extends in a direction away from the supporter 120B along the axis Y. Therefore, each gripping portion 210A has an indentation, and the openings of the two indentations face each other. When the two gripping members 210 approach each other to grip an object G, the two gripping portions 210A of the two gripping members 210 intersect, and the two grooves R2 on the two gripping portions 210A also face each other.

Figure 1A:
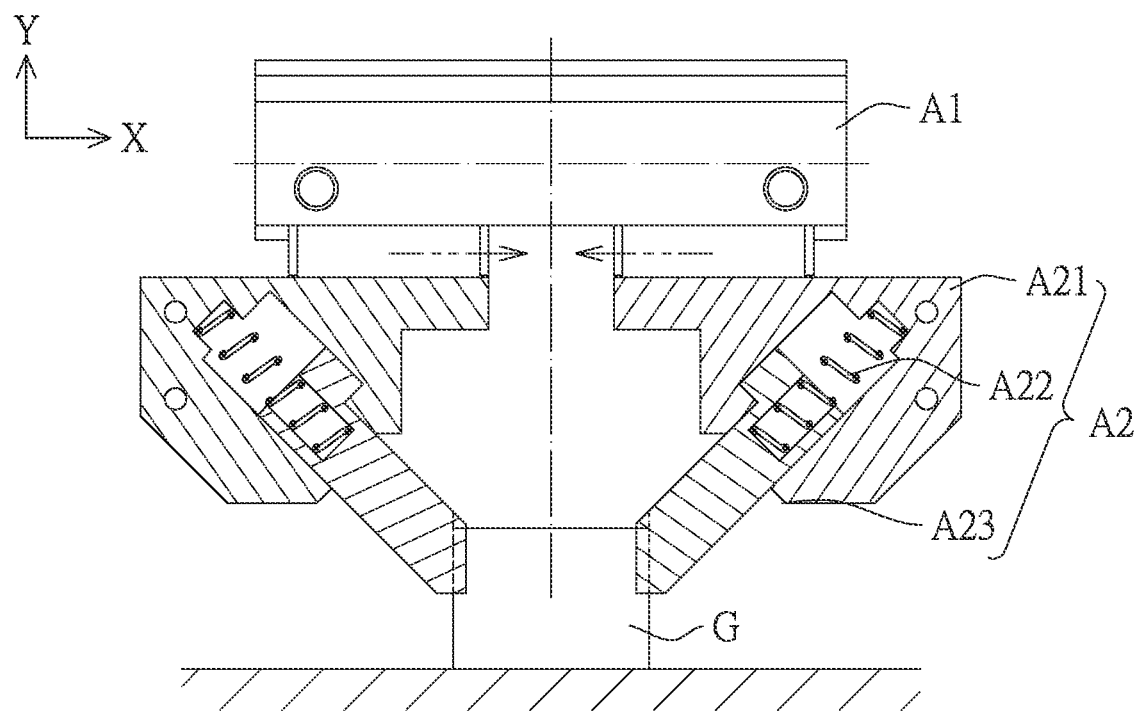
FIGS. 1A to 1B are schematic views of the conventional gripper devices.
Figure 1B:
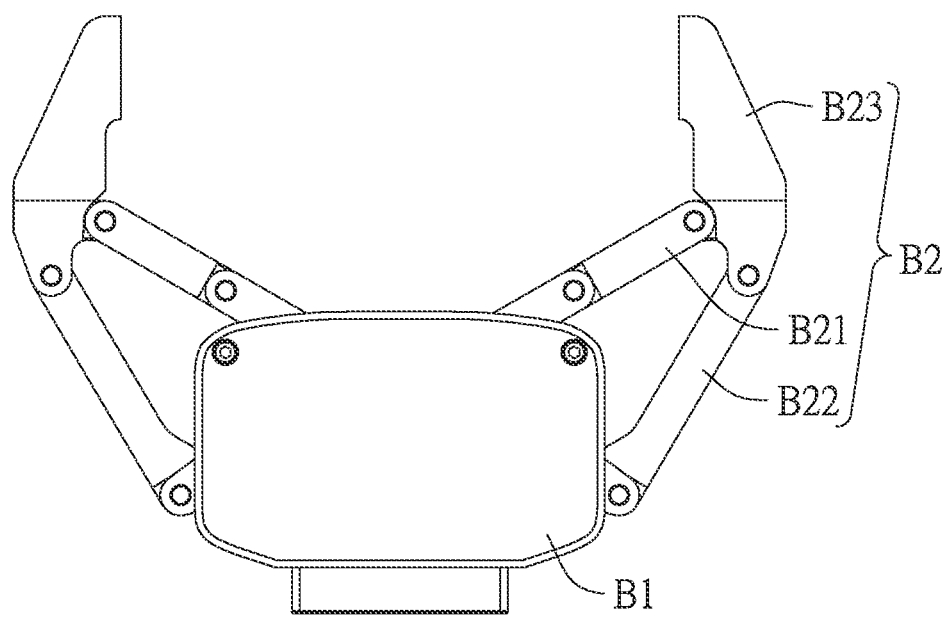

On the other hand, in this embodiment or other embodiments, at least one of the gripping assemblies 21 further includes an adjustment member 17, and the supporting portion 210B of the gripping member 210 of this gripping assembly 21 further includes an adjustment mechanism 115. The adjustment member 17 and the adjustment mechanism 115 in FIG. 5 are the same as or similar to the adjustment member 17 and the adjustment mechanism 115 in FIG. 1, and therefore, the descriptions related to the adjustment member 17 and the adjustment mechanism 115 in FIG. 5 can refer to the above-mentioned descriptions related to the adjustment member 17 and the adjustment mechanism 115 in FIG. 1, and are omitted hereinafter.

In this embodiment or other embodiments, the supporting portion 210B of each gripping member 210 further includes a protruding structure 216 protruding from the third surface 213. The protruding structure 216 may protrude from the third surface 213 along the axis X, for example. Since the two third surfaces 213 of the two gripping members 210 face each other, the two protruding structures 216 also face each other. A part of the third surface 213, located on the protruding structure 216, may be, for example, a flat surface or a curved surface.

In this embodiment or other embodiments, at least one of the supporting portions 210B further includes a stop member BR protruding from the first surface 211 or the second surface 212 of the supporting portion 210B. The stop member BR is used for being abutted against by the adjustment member 17 installed on the opposite supporting portion 210B.

Figure 7D:
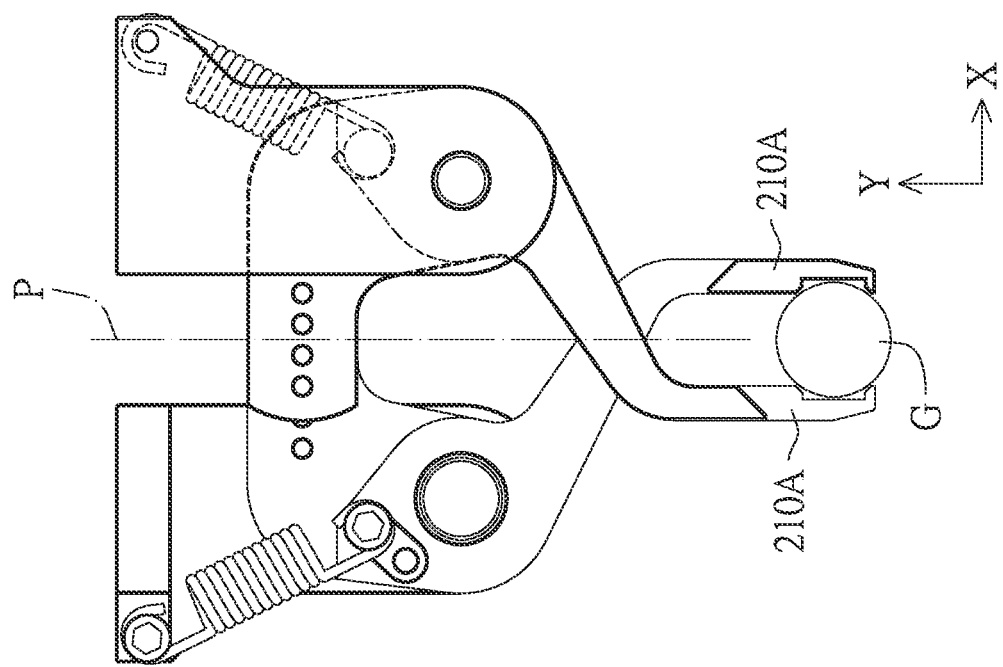
Figure 7C:
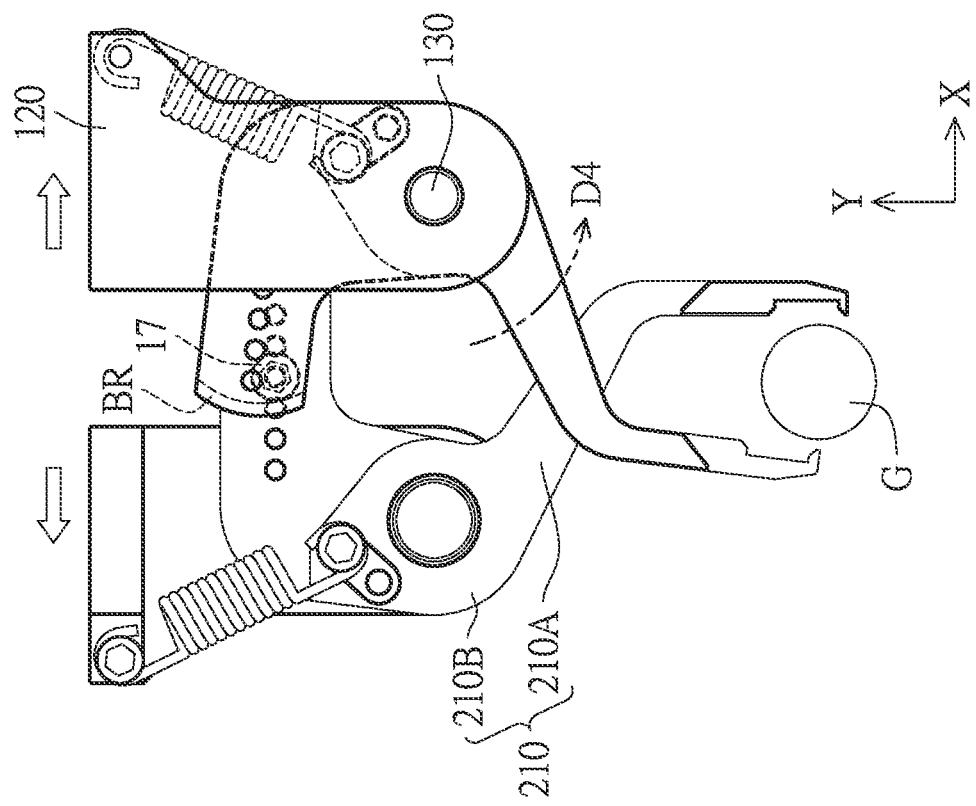

In the process of gripping an object G, the gripper device first moves along the axis Y to make the gripping portions 210A of the gripping members 210 approach the object G, as shown in FIG. 7A. When one of the gripping portions 210A touches the object G, as shown in FIG. 7B, the gripping member 210 touching the object G swings slightly along the direction D3. At this time, the space between the two gripping portions 210A becomes larger, so that the gripper device can continue moving downward along the axis Y until the object G enters the two grooves R2 of the two gripping portions 210A, as shown in FIG. 7B. After the object G enters the two grooves R2, the two gripping members 210 can move away from each other along the axis X until the stop member BR on one gripping member 210 touches the adjustment member 17 on the other gripping member 210, as shown in FIG. 7C. While the two gripping members 210 are moving away from each other, the gripping members 210 slightly swing in the direction D4 until the force balance occurs between the tensile force on the elastic member 140 connecting the stand 120 and the supporting portion 210B and the contact force of the gripping portions 210A touching the object G. At this time, the two gripping portions 210A can clamp the object G so that the object G is held on the central axis P of the gripper device, as shown in FIG. 7D. Then, the gripper device can move in the opposite direction along the axis Y to complete the gripping task.

In the above embodiments, the elastic member 140 is connected to the second surface 112 (212) of the supporting portion 110B (210B) on the gripping member 110 (210) through the connecting member 15 and the connector 120A of the stand 120; and however, the present invention is not limited to these embodiments.

Figure 8:
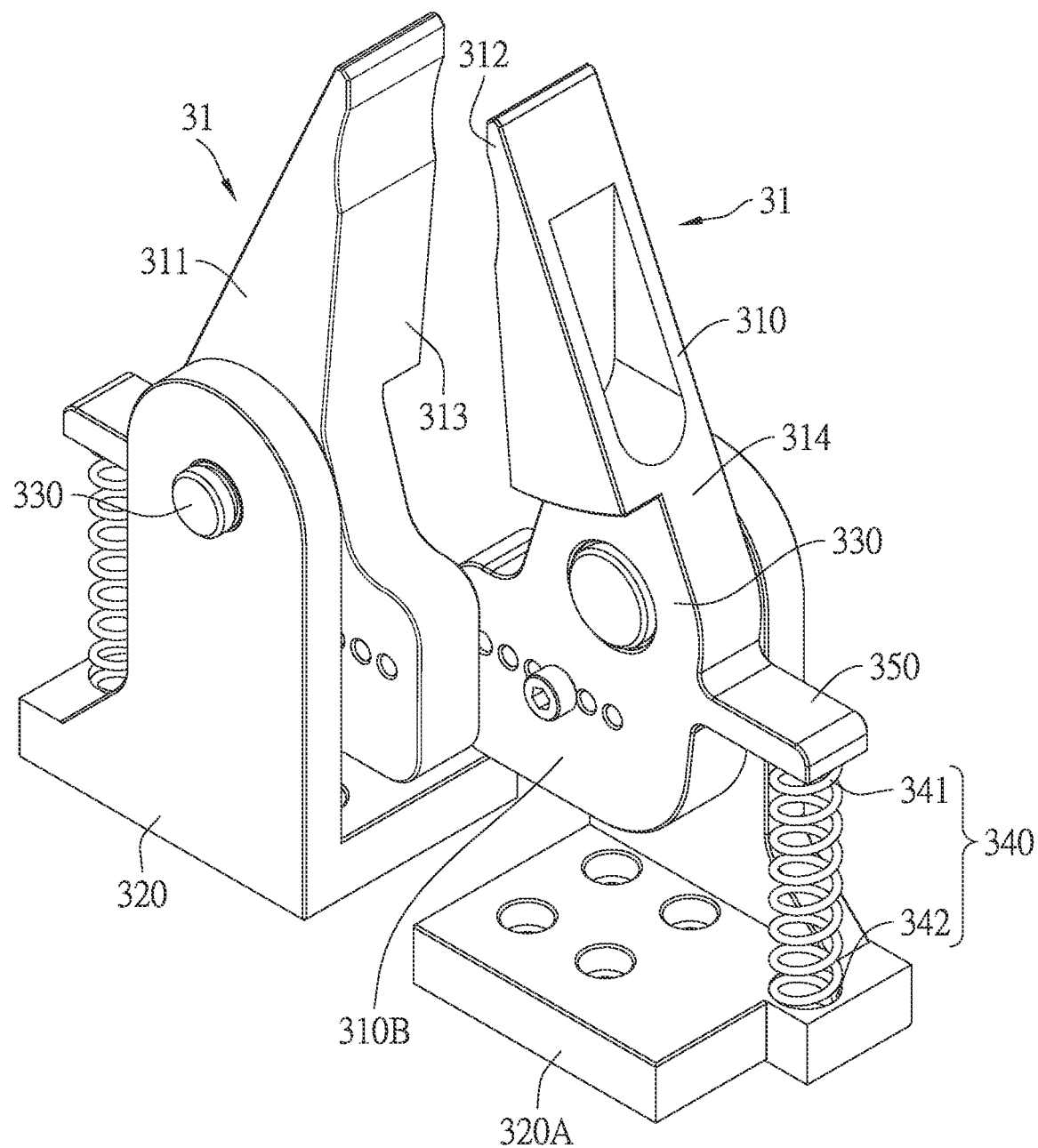
FIG. 8 is a perspective view of a gripper device according to still another embodiment of the present invention.

In other embodiments of the present invention, as shown in FIG. 8, in each gripping assembly 31, the gripping member 310 may be, for example, the gripping member 110 of FIG. 2 or the gripping member 210 of FIG. 5. The gripping member 310 includes a first surface 311, a second surface 312 opposite to the first surface 311, a third surface 313 connected to the first surface 311 and the second surface 312, and a fourth surface 314 opposite to the third surface 313. The supporting portion 310B of the gripping member 310 further includes an extension portion 350. The extension portion 350 may extend and protrude from the fourth surface 314 of the gripping member 310, for example. The first end 341 of the elastic member 340 of the gripping assembly 31 can be connected to the extension portion 350 of the supporting portion 310B, and the second end 342 of the elastic member 340 can be connected to the connector 320A of the stand 320.

In the above embodiments, the gripping member and the stand of one gripping assembly are arranged to be symmetric to the gripping member and the stand of the other gripping assembly relative to two perpendicular virtual planes. For example, the symmetrical arrangement with respect to two perpendicular virtual planes in FIG. 2 means that the two second surfaces 112 of the two gripping members 110 of the two gripping assemblies 11 that are far away from and opposite to the supporters 120B of the corresponding stands 120, are respectively facing two opposite sides of the gripper device; and the two gripping members 110 are arranged to be symmetrical to each other relative to a first virtual plane extending along the central axis P while the two stands 120 are arranged to be symmetric to each other relative to a second virtual plane extending along the central axis P and perpendicular to the first virtual plane. However, the present invention is not limited to these embodiments. In other embodiments of the present invention, the gripping member and the stand of one gripping assembly may be arranged in (mirror) symmetry with respect to the gripping member and the stand of the other gripping assembly relative to the same virtual plane, and the symmetrical arrangement with respect to the same virtual plane is exemplarily described as follows.

Figure 9:
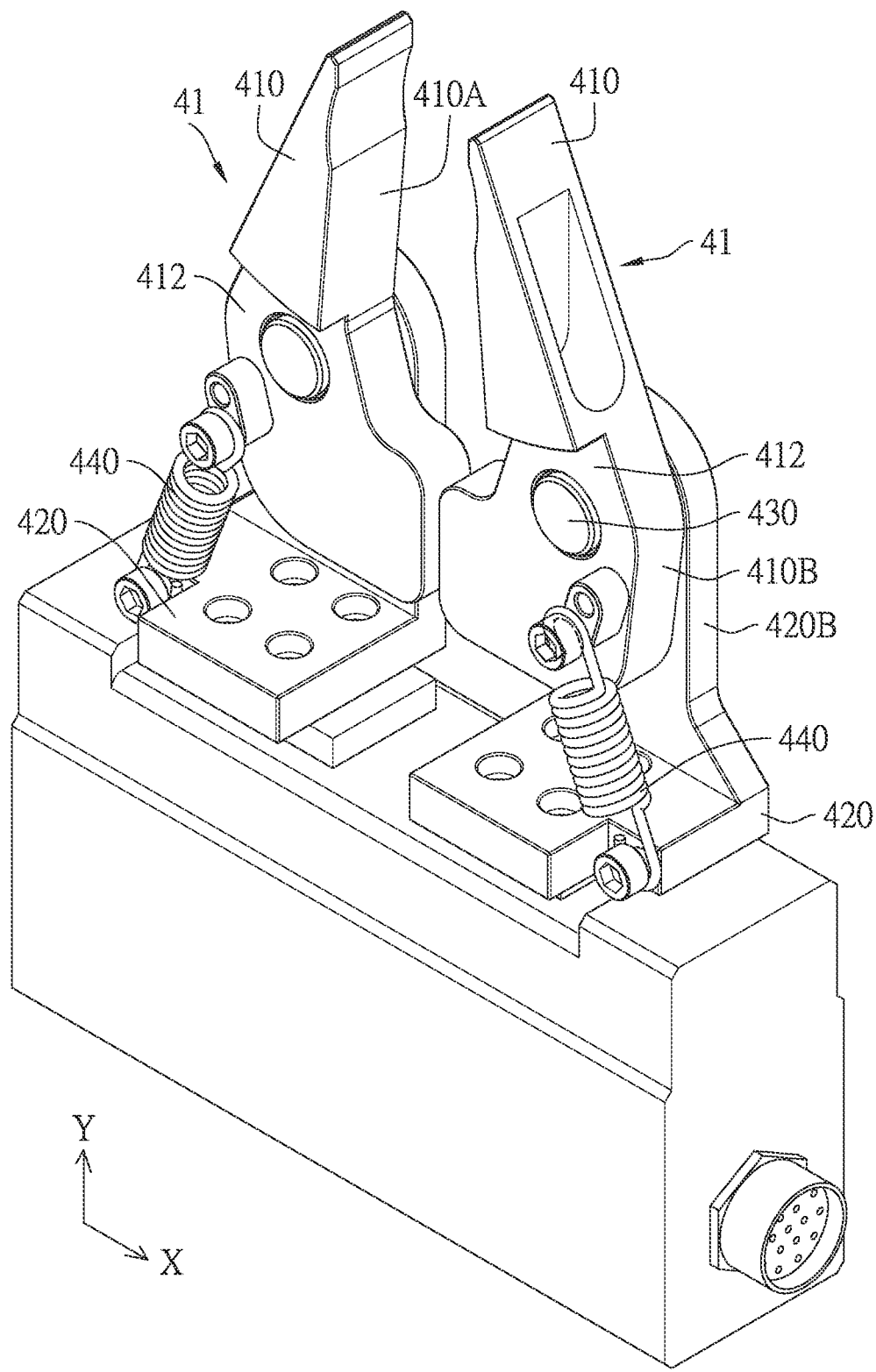
FIG. 9 is a perspective view of a gripper device according to yet another embodiment of the present invention.

Please refer to FIG. 9, the gripper device includes two gripping assemblies 41, and each gripping assembly 41 includes a gripping member 410, a stand 420, a pivoting member 430 and an elastic member 440. The two surfaces 412 of the two gripping members 410 of the two gripping assemblies 41 that are far away from and opposite to the supporters 420B of the corresponding stands 420, are respectively facing the same side of the gripper device. The two gripping members 410 are arranged to be symmetric to each other with respect to the first virtual plane while the two stands 420 are arranged to be symmetrical to each other with respect to the first virtual plane. In addition, the adjustment mechanism and the adjustment member on the supporting portion 410B of each gripping member 410 can be omitted. The rest of the arrangement of the gripping member 410, the stand 420, the pivoting member 430 and the elastic member 440 in FIG. 9 can refer to the arrangement of the gripping member 110, the stand 120, the pivoting member 130 and the elastic member 140 in FIG. 2, or refer to the arrangement of the gripping member 210, the stand 120, the pivoting member 130, and the elastic member 140 in FIG. 5, or refer to the arrangement of the gripping member 310, the stand 320, the pivoting member 330, and the elastic member 340 in FIG. 8, and their descriptions are omitted hereinafter.

When the end of the gripping portion 410A of one of the gripping members 410 touches an object in the process of gripping the object, the two gripping assemblies 41 can be brought close to each other along the axis X, and the minimum distance between the supporting portions 410B is maintained at a specific value. At this time, the gripper device can continue to move along the axis Y, so that the object enters the space between the two gripping portions 410A. In the process of the object entering the space between the two gripping portions 410A, the gripping members 410 swing slightly relative to the stands 420, and the swing is limited by the minimum distance between the two supporting portions 410B, that is, when the two supporting portions 410B are in contact due to the swing of at least one of the gripping members 410, the swing gripping member 410 cannot continue swinging in the same direction. At this time, the two gripping assemblies 41 can be kept close to each other along the axis X or remain still, until the force balance occurs between the tension on the elastic member 440 and the contact force on the gripping portion 410A; whereby, the two gripping portions 410A are able to grip the object to keep the object on the central axis of the gripper device. Then, the gripper device can move in the opposite direction along the axis Y to complete the gripping task.

Figure 10:
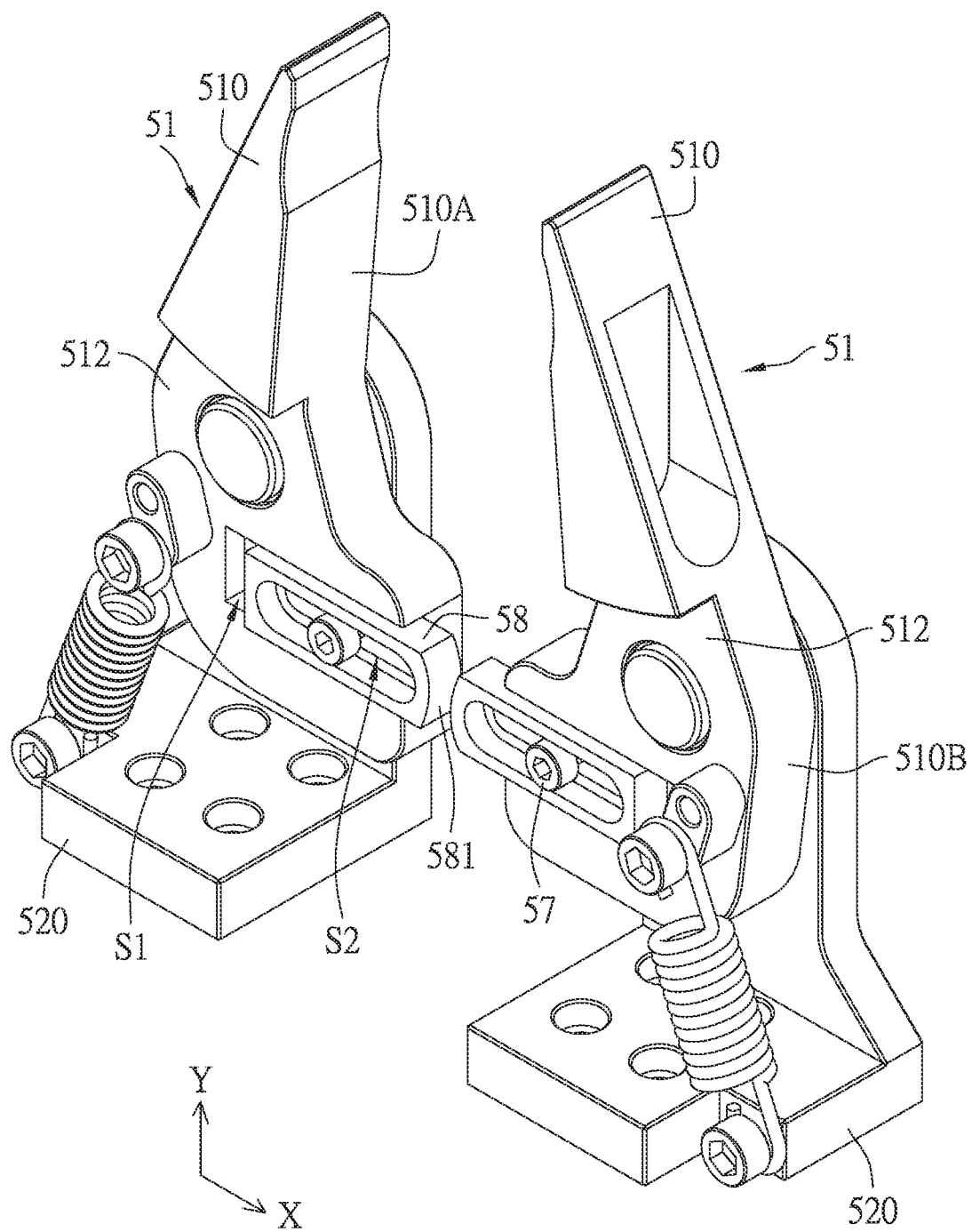
FIG. 10 is a perspective view of a gripper device according to yet another embodiment of the present invention.

In order to make the gripping space between the two gripping portions of the two gripping assemblies arranged in mirror symmetry with respect to the same virtual plane adjustable to adapt to different sizes of objects to be taken, the supporting portion of at least one of the gripping assemblies can be further provided with an adjustment mechanism and an adjustment member. For example, as shown FIG. 10, the gripper device includes two gripping assemblies 51, and the supporting portion 510B of at least one of the gripping assemblies 51 further includes an adjustment mechanism and an adjustment member 57. In detail, the adjustment mechanism includes a sliding groove S1 disposed to the surface 512 of the gripping member 510 away from the stand 520, and a slider 58 disposed in the sliding groove S1 and including a sliding groove S2. The two sliding grooves S1 and S2 can extend along the axis X. A concave hole (not shown) can be recessed in the sliding groove S1, and the adjustment member 57 can be inserted into the concave hole. The slider 58 can move to different adjustment positions relative to the gripping member 510 along the sliding groove S1 in the axis X, so that the adjustment member 57 can move to different corresponding adjustment positions relative to the slider 58 along the sliding groove S2 at the same time. Thereby, the extent which the slider 58 protrudes from the supporting portion 510B of the gripping member 510, that is, the extent which the surface 581 of the slider 58 facing the opposite gripping member 510 protrudes from the gripping portion 510B, can be selectively adjusted, to further adjust the size of the maximum gripping space between the two gripping portions 510A of the two gripping members 510.

Figure 11:
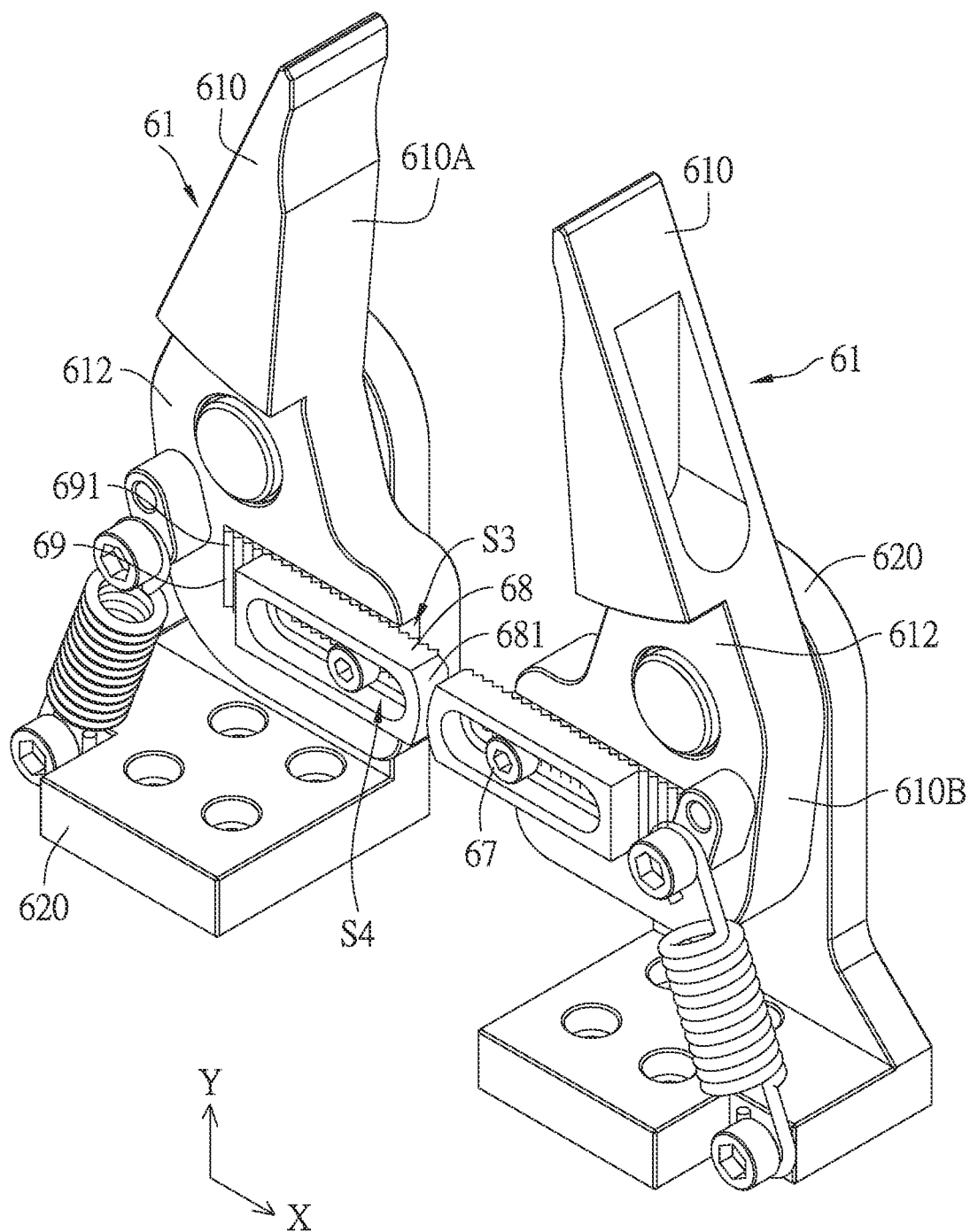
FIG. 11 is a perspective view of a gripper device according to yet another embodiment of the present invention.

Alternatively, the adjustment mechanism may include, for example, as shown in FIG. 11, a groove S3 disposed to the surface 612 of the gripping member 610 of the gripping assembly 61 away from the corresponding stand 620, a slider 68 with a sliding groove S4, and a toothed member 69 disposed in the groove S3. The toothed member 69 can be, for example, a gasket made of elastic material, and includes a toothed surface 691 and a concave hole (not shown) recessed in the toothed surface 691. The two sliding grooves S3 and S4 may extend along the axis X. The adjustment member 67 can be inserted into the sliding groove S4 of the slider 68 first, and then inserted into the concave hole on the toothed member 69 to movably install the slider 68 on the toothed member 69. A surface of the slider 68 facing the toothed member 69 may be a toothed surface 682, and the pattern of the toothed surface 682 matches that of the toothed surface 691 of the toothed member 69. The slider 68 can move to different adjustment positions relative to the gripping member 610 along the axis X, so that the adjustment member 67 can move to corresponding different adjustment positions relative to the slider 68 along the sliding groove S4 at the same time. Therefore, the extent which the slider 68 protrudes from the supporting portion 610B of the gripping member 610, that is, the extent that the surface 681 of the slider 68 facing the opposite gripping member 610 protrudes from the supporting portion 610B where it is located, can be selectively adjusted to further adjust the size of the maximum gripping space between the two gripping portions 610A of the two gripping members 610.

Although the above-mentioned embodiment is described based on an example in which the pivoting member is inserted into the supporter of the stand and the supporting portion of the gripping member, the present invention is not limited to this example. In other embodiments of the present invention, other pivotally connecting manners can also be used between the supporter of the stand and the supporting portion of the gripping member, so that the gripping member can pivot relative to the stand.

Although the present invention is disclosed in the foregoing embodiments, these embodiments are not intended to limit the present invention. Without departing from the spirit and scope of the present invention, all modifications and combinations of various implementation modes are within the scope of the claims the present invention. For the scope of protection defined by the present invention, please refer to the attached claims.

What is claimed is:

1. A gripper device comprising:
    a base; and
    two gripping assemblies, each of the gripping assemblies comprising:
        a gripping member including a gripping portion and a supporting portion, wherein the supporting portion includes a first pivoting portion;
        a stand movably disposed to the base and including a connector and a supporter, wherein the supporter includes a second pivoting portion pivotally connected to the first pivoting portion, so that the gripping member is able to pivot relative to the stand, and a position where the first pivoting portion and the second pivoting portion are pivotally connected is located between the gripping portion and the connector; and
        an elastic member including a first end and a second end opposite to the first end, wherein the first end of the elastic member is connected to the supporting portion, and the second end of the elastic member is connected to the connector, wherein:
    when the gripping portion of the gripping member of one of the gripping assemblies touches an object and the two gripping assemblies do not abut against each other, the gripping member pivots relative to the corresponding stand; and
    when the gripping portion of the gripping member of one of the gripping assemblies touches the object and the supporting portions of the two gripping assemblies abut against each other, the pivoting of the gripping members is restricted so that the object is gripped by the gripping portions.

2. The gripper device as claimed in claim 1, wherein each of the gripping members further includes a first surface, a second surface opposite to the first surface, and a third surface connected to the first surface and the second surface, the third surfaces of the gripping members face each other, and the supporting portion of each of the gripping members further includes a protruding structure protruding from the corresponding third surface.

3. The gripper device as claimed in claim 1, wherein at least one of the gripper assemblies further includes an adjustment member and an adjustment mechanism on the supporting portion, the first pivoting portion is located between the adjustment mechanism and the gripping portion, the adjustment mechanism includes a plurality of adjustment positions, the adjustment member is configured to be mounted on one of the adjustment positions, and when the adjustment member is located at different one of the adjustment positions, a size of a maximum space between the two gripping portions is defined.

4. The gripper device as claimed in claim 3, wherein the adjustment mechanism includes a plurality of plugholes which respectively correspond to the adjustment positions.

5. The gripper device as claimed in claim 3, wherein the adjustment mechanism includes a sliding groove, and the adjustment positions are respectively arranged on the sliding groove.

6. The gripper device as claimed in claim 5, wherein the adjustment mechanism further includes a slider, the sliding groove is formed on the slider, and the adjustment member is inserted in the sliding groove and fixed to the supporting portion.

7. The gripper device as claimed in claim 3, wherein each of the gripping members further includes a first surface, a second surface opposite to the first surface, and a third surface connected to the first surface and the second surface, the third surfaces of the gripping members face each other, and the supporting portion of the other one of the gripping assemblies further includes a stop member for the adjustment member, which is located on the one of the gripping assemblies, to abut against.

8. The gripper device as claimed in claim 1, wherein the gripping members cross each other while gripping the object.

9. The gripper device as claimed in claim 1, wherein the supporting portion of the gripping member further includes an extension portion, the first end of the elastic member is connected to the extension portion of the supporting portion, and the second end of the elastic member is connected to the connector.

10. The gripper device as claimed in claim 1, wherein the gripping member and the stand of one of the gripping assemblies are arranged to be symmetrical with respect to the gripping member and the stand of the other one of the gripping assemblies.

11. The gripper device as claimed in claim 1, wherein the base is movable in a first axis, the two gripping assemblies are separable from each other, and the stands of the two gripping assemblies are movable with respect to each other in a second axis perpendicular to the first axis.

* * * * *